United States Patent [19]

Bauck et al.

[11] Patent Number: 4,571,646
[45] Date of Patent: * Feb. 18, 1986

[54] MAGNETIC DISK DRIVE HAVING A MOVABLE DRIVE MOTOR

[75] Inventors: Randall C. Bauck, Layton; S. Peter Kleczkowski; Anton J. Radman, both of Ogden, all of Utah

[73] Assignee: Iomega Corporation, Ogden, Utah

[*] Notice: The portion of the term of this patent subsequent to Feb. 26, 2002 has been disclaimed.

[21] Appl. No.: 440,335

[22] Filed: Nov. 9, 1982

Related U.S. Application Data

[63] Continuation-in-part of Ser. No. 256,594, Apr. 22, 1981, Pat. No. 4,502,083.

[51] Int. Cl.⁴ ............................................. G11B 5/016
[52] U.S. Cl. ....................................................... 360/99
[58] Field of Search ..................... 360/97, 98, 99, 102, 360/131, 132, 133, 135

[56] References Cited

U.S. PATENT DOCUMENTS

| | | | |
|---|---|---|---|
| 3,529,301 | 9/1970 | Hiruta | 340/174.1 |
| 3,593,327 | 7/1971 | Shill | 340/174.1 |
| 3,678,481 | 7/1972 | Dalziel et al. | 340/174.1 C |
| 3,696,350 | 10/1972 | Cohen et al. | 360/99 |
| 3,815,150 | 6/1974 | Stoddard et al. | 360/97 |
| 3,940,793 | 2/1976 | Bleiman | 360/99 |
| 3,947,886 | 3/1976 | Heidecker et al. | 360/99 |
| 3,951,264 | 4/1976 | Heidecker et al. | 206/444 |
| 3,959,823 | 5/1976 | Heidecker et al. | 360/99 |
| 3,975,768 | 8/1976 | Jacques et al. | 360/99 |
| 3,990,111 | 11/1976 | Elliott | 360/99 |
| 4,074,330 | 2/1978 | Norton et al. | 360/102 |
| 4,089,029 | 5/1978 | Castrodale et al. | 360/99 |
| 4,125,883 | 11/1978 | Rolph | 360/99 |
| 4,131,199 | 12/1978 | Hatchett et al. | 206/444 |
| 4,306,259 | 12/1981 | Saito et al. | 360/133 |

FOREIGN PATENT DOCUMENTS 2460024 1/1981 France .

OTHER PUBLICATIONS

Disk Drive for Interchangeable Flexible Disk Cartridges, M. W. J. Carmichael and N. A. Feliss, vol. 20, No. 11A, Apr. 1978, IBM Technical Disclosure Bulletin, pp. 4621–4622.

Primary Examiner—George G. Stellar
Attorney, Agent, or Firm—Woodcock Washburn Kurtz Mackiewicz & Norris

[57] ABSTRACT

A magnetic disk drive has a drive motor mounted on a yoke which is rotatable about a pivot in the drive. A bezel member mounted on the end of the yoke normally closes the opening in the disk drive through which a cartridge is inserted. As this bezel member is moved out of the cartridge, the motor is moved out of the position in which it engages the disk and when the bezel member is closed, the motor moves into the engagement position. The motor is mounted on the yoke with a movable connection so that it is guided in a linear movement into engagement with the motor. In one embodiment the motor is guided by a shaft extending from the drive base plate through a guide opening in the motor.

14 Claims, 10 Drawing Figures

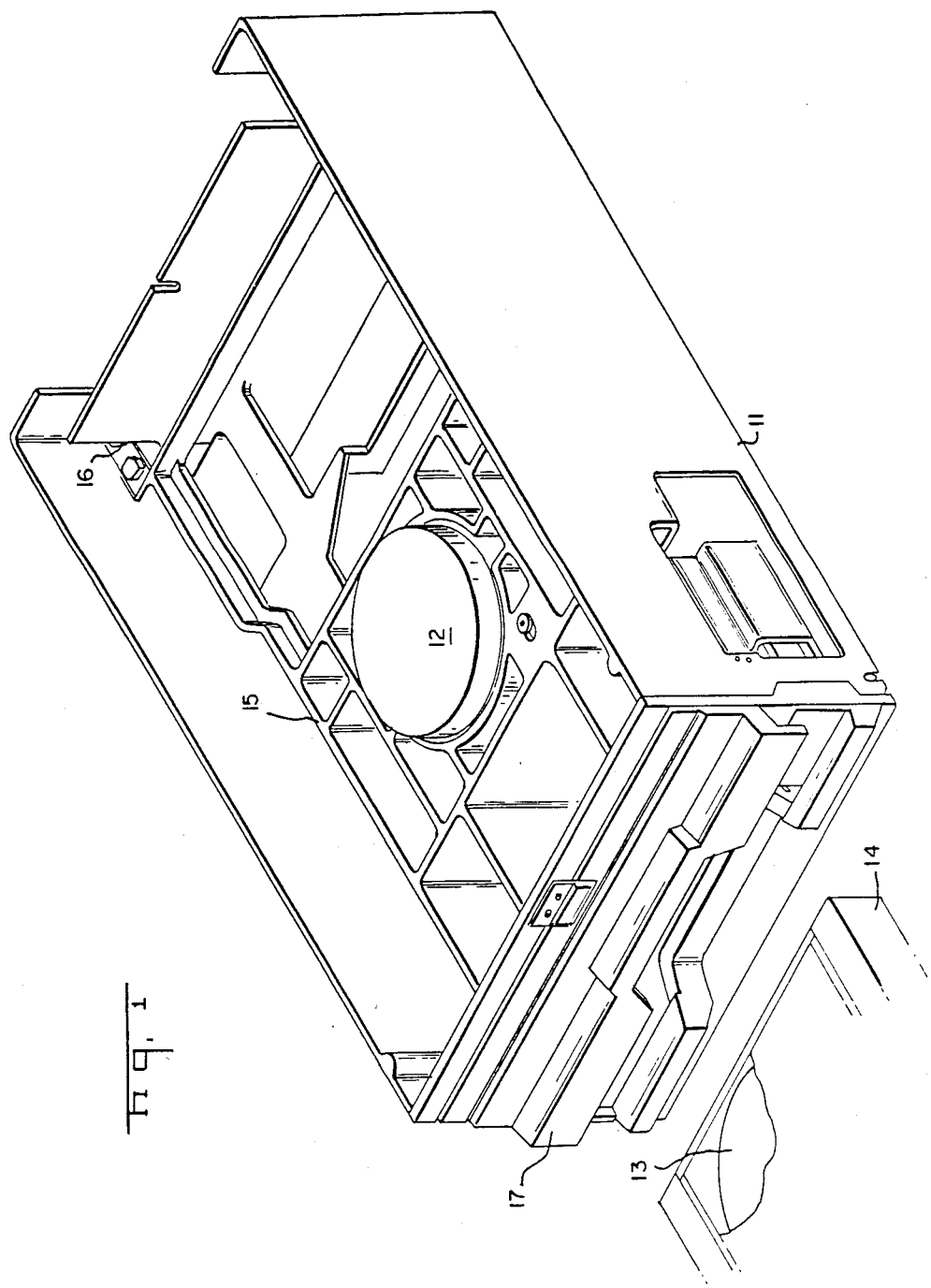

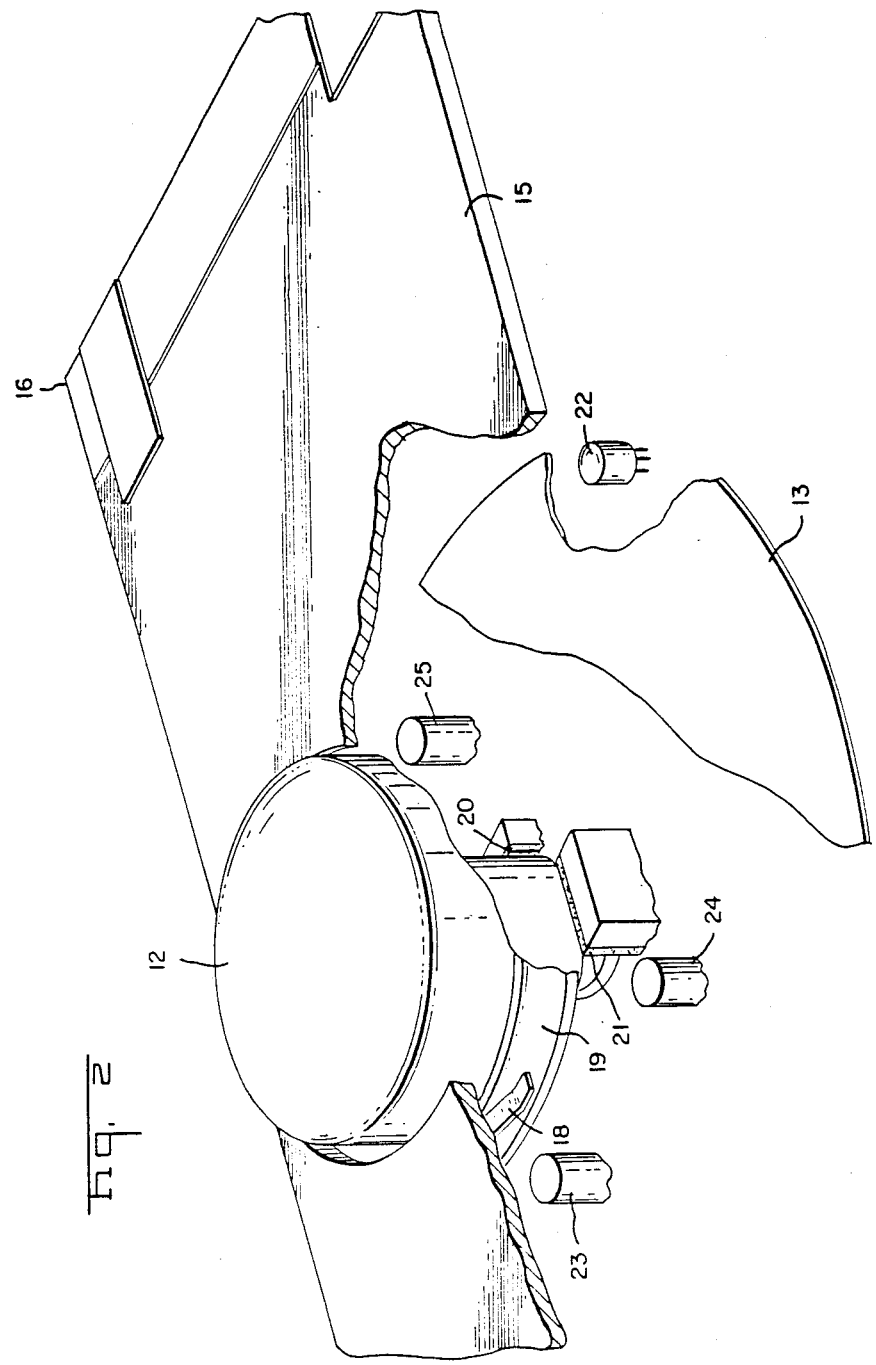

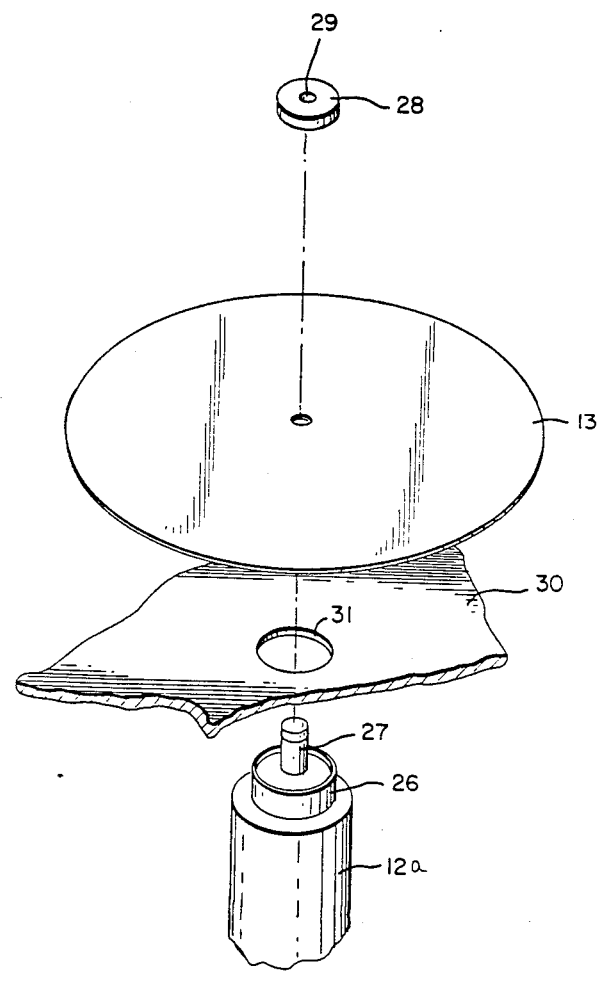

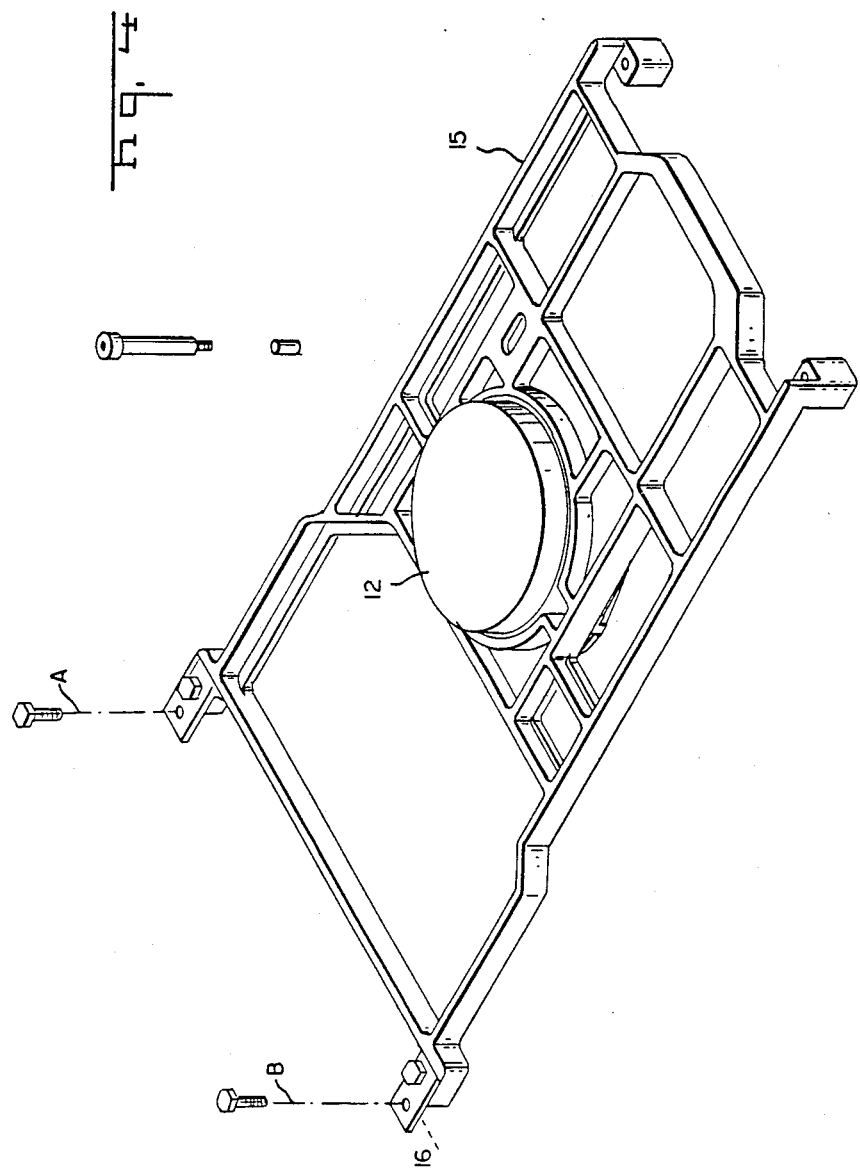

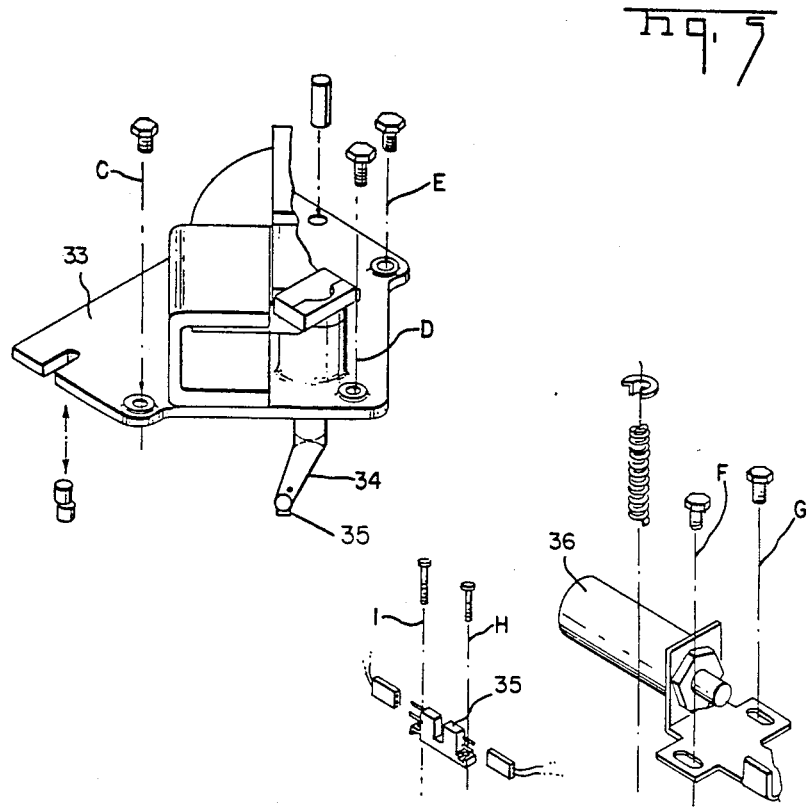

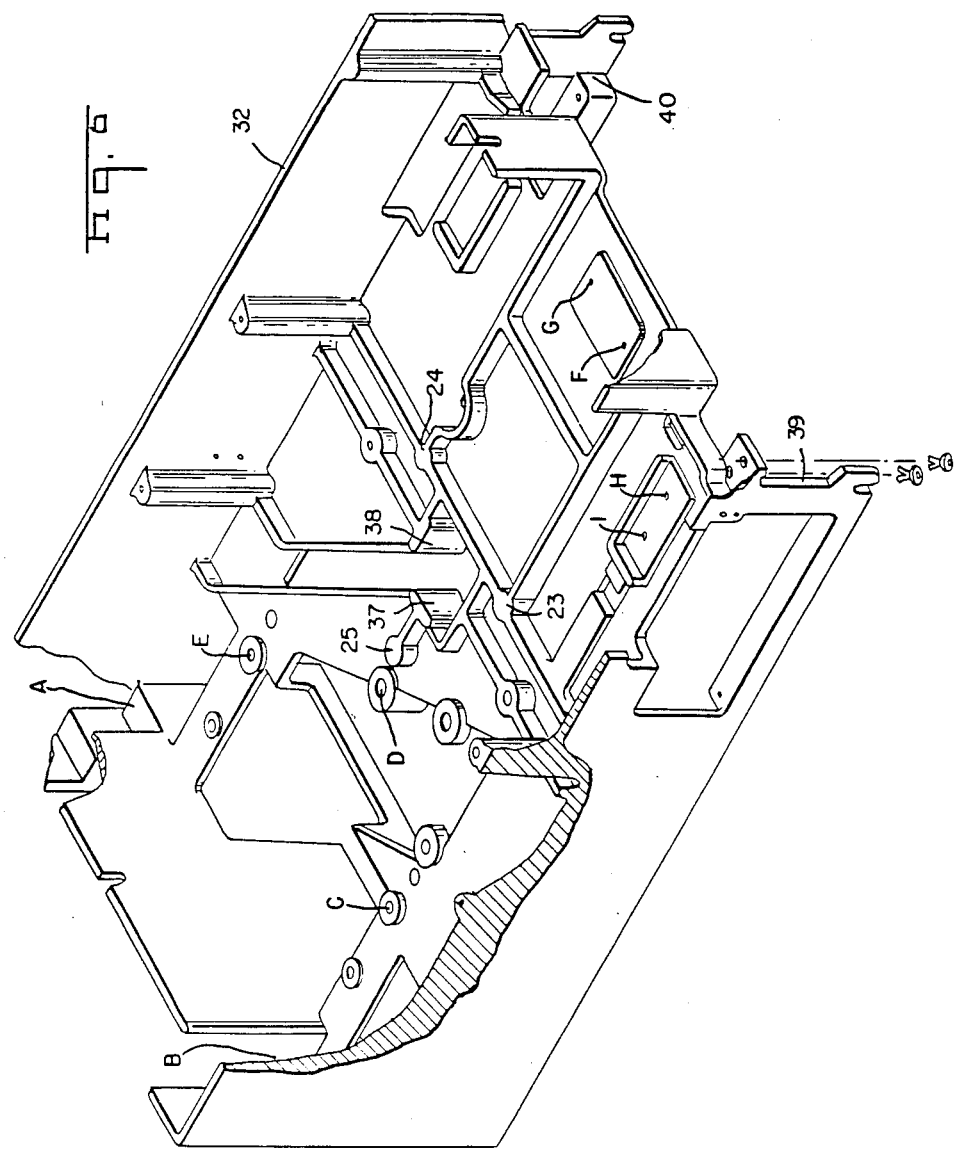

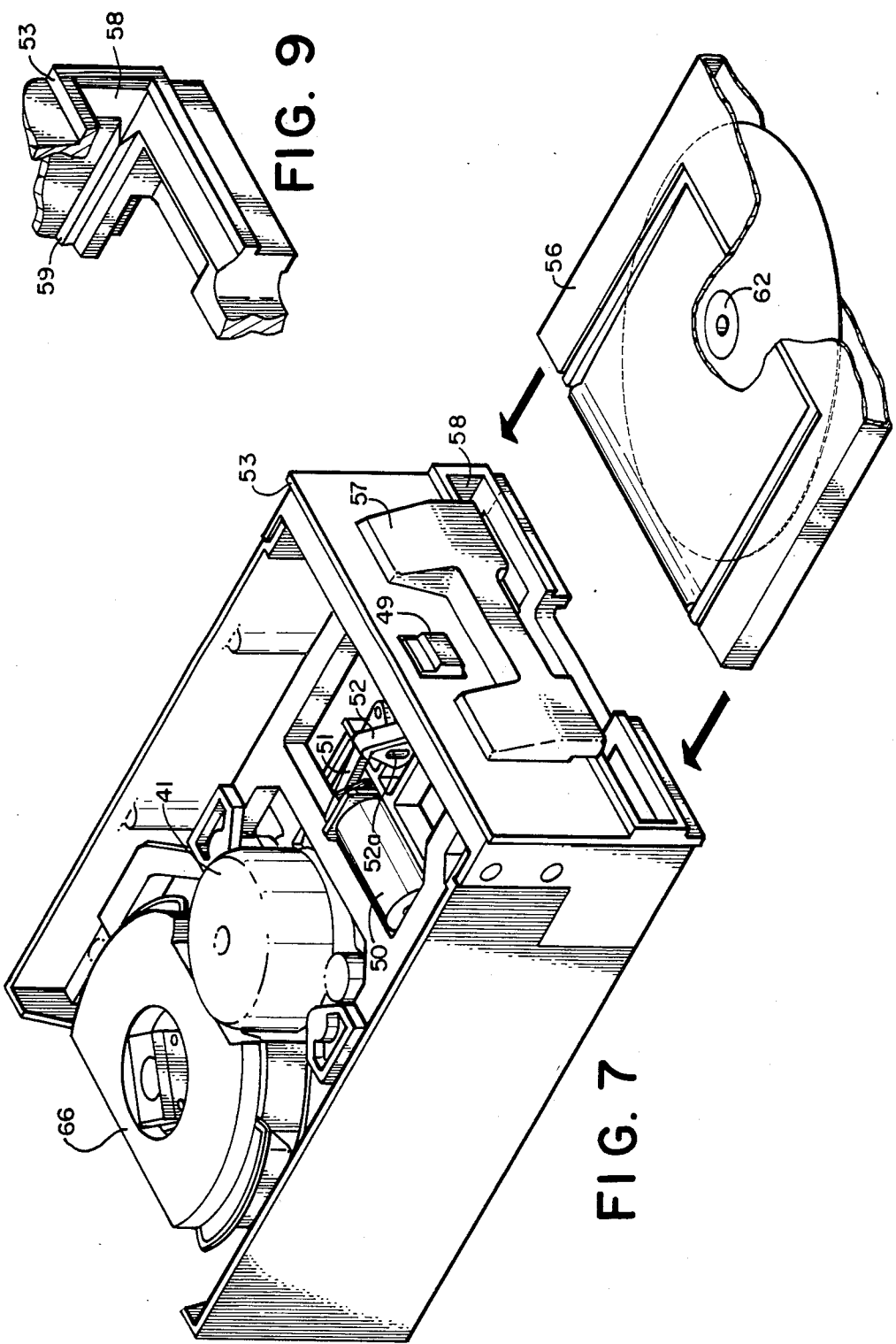

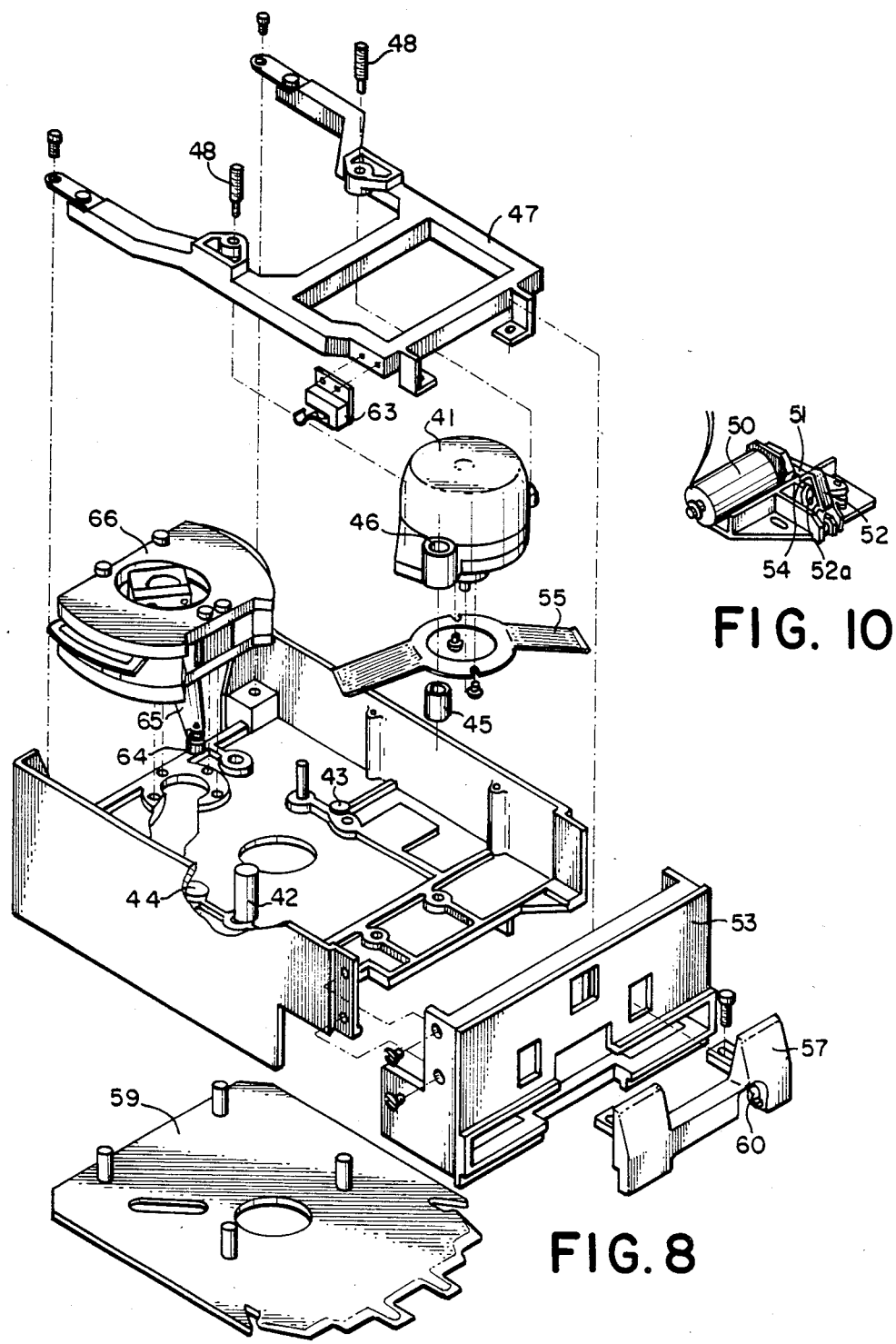

MAGNETIC DISK DRIVE HAVING A MOVABLE DRIVE MOTOR

This is a continuation-in-part of application Ser. No. 256,594, Bauck, Kleczkowski, and Radman, filed Apr. 22, 1981, now U.S. Pat. No. 4,502,083.

BACKGROUND OF THE INVENTION

This invention relates to magnetic disk drives and more particularly, to a disk drive in which the motor is translated into engagement with the disk.

Recently, magnetic disk drives which write and read digital data from flexible magnetic disks have been extensively used. These are frequently referred to as "floppy" disks and "floppy disk drives." These drives have been extensively used for small, so-called microcomputer, systems, for word-processing applications, and the like.

In order to rotate the flexible magnetic disk in read/write relationship with a magnetic recording head, a rotatable spindle must engage the center of the disk and disengage the disk when the operation has been completed. Floppy disk drives typically force and hold the disk center onto a fixed rotatable spindle by use of a clamp which comes from the back side of the disk. Since the actual drive spindle is fixed from translating, the critical dimensions from the hub center and hub height with respect to the recording head are fixed. However, this approach requires that the disk cartridge have an opening through which the clamp contacts and moves the media. The typical floppy disk cartridge exposes certain areas of the disk recording surface to dust contamination, liquid spillage, fingerprints, and scratching.

Examples of floppy disk drives are shown in U.S. Pat. Nos. 3,990,111—Elliott, 3,678,481—Dalziel et al, 3,815,150—Stoddard et al, 4,125,883—Rolph, and 4,089,029—Castrodale et al.

It is an object of the present invention to engage the magnetic disk with both a drive motor and a recording head from the same side of the disk and through a common opening in the rigid disk cartridge. This allows the single opening in the cartridge to be closed by a slider or the like when the cartridge is not in the disk drive, thereby eliminating a potential source of communication.

SUMMARY OF THE INVENTION

In accordance with the present invention, the disk drive motor is mounted on a yoke which is rotatable about a pivot in the disk drive. A bezel member mounted on the end of the yoke normally substantially closes the opening through which the magnetic disk cartridge is inserted into the drive. When the bezel member is moved by the operator out of this opening in order to insert a cartridge, the motor is moved out of the position in which it will engage the magnetic disk. After insertion of the cartridge, the bezel member is closed and this rotates the yoke to move the motor into position and engagement with the magnetic disk.

The yoke is pivoted on a disk drive base casting on which the magnetic read/write head actuator is mounted. To allow the critical dimensions from the disk hub center to the actuator and the disk hub height with respect to a Bernoulli surface to be maintained, the motor has a movable connection with the yoke. The motor is guided by reference surfaces in the base so that it moves linearly into engagement with the disk without sweeping an arc. Further maintenance of critical dimensions is obtained by reference surfaces which set the height of the motor spindle with respect to the hub of the disk.

In accordance with another aspect of the invention, a shaft on the base casting cooperates with a guide opening on the motor to move the motor linearly into engagement with the disk within a linear movement. The shaft is perpendicular to the reference surfaces against which the motor moves when it is in engagement with the magnetic disk.

The foregoing and other objects, features and advantages of the invention will be better understood from the more detailed description and appended claims.

SHORT DESCRIPTION OF THE DRAWINGS

FIG. 1 is a front perspective view of the disk drive of this invention;

FIG. 2 is a cut-away view of the motor spindle and the disk;

FIG. 3 shows the motor spindle, Bernoulli plate, and disk;

FIG. 4 shows the yoke and motor spindle;

FIG. 5 shows the base casting;

FIG. 6 shows the actuator for the magnetic recording heads;

FIG. 7 shows an improved modification of the disk drive of this invention;

FIG. 8 is an exploded view of FIG. 7;

FIG. 9 shows a portion of the panel with the guide surfaces;

FIG. 10 shows the latch mechanism in more detail.

DESCRIPTION OF THE PREFERRED EMBODIMENT

In FIG. 1, the magnetic disk drive 11 includes a motor 12 having a spindle for rotating a magnetic disk 13 which is contained in a cartridge 14. The motor is mounted on a yoke 15 which is pivoted at 16 on the base casting.

A bezel member 17 is mountd on the end of the yoke. Normally, the bezel member closes the opening through which the cartridge 14 is insertd into the disk drive. When the operator moves the bezel member 17 out of the opening, in order to insert the cartridge, the yoke is rotated about the pivot point 16. This moves the motor 12 out of the position in which it will engage the magnetic disk. However, it is desirable that the motor not be allowed to sweep through an arc, as it would if it were rigidly attached to the yoke. Therefore, the motor has a movable connection to the yoke. This is better shown in FIG. 2 wherein the suspension spring 18 (and one or more other similar springs) are connected between a flange 19 on the motor 12 and the yoke 15. After the cartridge has been inserted, the operator moves the bezel member 17 toward its closed position. This rotates the yoke 15 about its pivot in a direction which moves the motor spindle toward the magnetic disk 13. Reference surfaces 20 and 21 in the base casting guide the motor, by movement of the motor with respect to the yoke, in a linear movement. This assures that the motor does not sweep an arc, but rather, moves linearly being guided by the "V" formed by the two reference surfaces 20 and 21. These surfaces maintain the relationship of the motor 12 to the recording head 22 in two of the three dimensional planes. The reference surfaces 20 and 21 are preferably covered with an antifriction material to allow easy sliding parallel to the planes of these surfaces.

The engagement of the motor hub with the disk is accomplished by moving the motor hub to a point near the disk hub. The final position of this movement is set by three reference pads 23, 24 and 25 on the base casting. The motor flange 19 engages these reference pads 23-25 to accurately position the height of the motor hub with respect to the height of the recording head 22 above the base casting. The suspension springs 18 which attach the motor 12 to the yoke 15 allow for over-travel or under-travel of the yoke with respect to the three pads 23-25, thereby eliminating the need for costly, tight tolerance.

Referring to FIG. 3, motor spindle 12a has a magnetic hub 26 and a shaft extension 27. Magnetic disk 13 has a ferrous hub 28 with a precision bore 29 therein. When the motor spindle 12a is moved into proximity to the disk 13, the ferrous hub 28 is magnetically attracted to the magnetic hub 26, thereby magnetically coupling the motor and the disk.

The disk 13 is positioned in proximity to a Bernoulli plate 30 which is fixed in the drive. The disk is rotated adjacent to the Bernoulli plate 30 by the motor 12. The Bernoulli plate 30 is between the disk 13 and the motor 12. Access of the motor to the disk is provided through the hole 31 in the Bernoulli plate 30. When the yoke is rotated to move the motor away from the disk, the magnetic hub 26 is pulled through the hole 31 to disengage the motor from the disk. The disk hub 28 with the disk is left behind to be removed inside the protective magnetic disk cartridge 14 from the drive.

The relationship between the pivoted yoke, magnetic read/write head actuator, and base casting are shown in FIGS. 4-6. The letters designate the center lines of the mounting holes in the base casting of FIG. 6. FIG. 4 shows the yoke 15 which is pivoted at 16. The motor spindle 12 is mounted on the yoke by suspension springs. The yoke is pivoted in the base casting 32 of FIG. 6.

FIG. 5 shows the actuator 33 which is fixed in the base casting 32. The actuator 33 has an arm 34. This carries the magnetic read/write head 35 into read/write relationship with the magnetic disk. Arm 34 traverses an arcuate path in the manner of a phonograph arm to couple the head to the disk surface.

FIG. 5 also shows the latch solenoid 36 which holds the yoke in the closed position.

FIG. 6 shows the base casting 32 which has the reference pads 23-25 which set the height of the motor with respect to the magnetic head carried by the actuator. The reference surfaces 20 and 21 (FIG. 2) are positioned along the surfaces 37 and 38 in FIG. 6. These reference surfaces guide the motor spindle as it moves into engagement with the disk. The Bernoulli plate 30 of FIG. 3 is mounted on the opposite side of the casting 32 from that shown in FIG. 6. The cartridge is inserted between the points 39 and 40 on the casting. Guide tracks guide the cartridge with respect to the casting.

FIGS. 7-10 show an improved modification of the invention which, in an exemplary embodiment, has been incorporated in a 5¼" disk drive. Motor 41 has a guide opening which rides along the shaft 42 pressed into the base casting. Shaft 42 is perpendicular to the reference surfaces 43 and 44 which the motor engages when it is in the position in which it engages the disk. The reference surfaces 43 and 44 assure proper hub penetration. The guide opening in the motor is defined by the bushing 45 inserted in the hole 46 in the motor. Linear movement guided by the bushing 45 on the shaft 42 assures that the motor hub will properly engage the disk. This is an improvement over the embodiment shown in FIGS. 1-6 in that it is much easier to provide accurate alignment with the bushing 45, whereas in the embodiment of FIGS. 1-6 it was necessary to accurately machine surfaces on the motor. Further, it is necessary to bias the motor accurately against the surfaces 20 and 21 in FIG. 2.

To translate the motor from a static or up position, yoke 47 is rotated about its pivot against the bias provided by spring screws 48. In the down, or operating position, the spring screws 48 provide sufficient force to keep the motor 41 firmly against the reference surfaces 43 and 44. To return the motor to the up position, the button 49 is depressed, and activates the solenoid 50 which acts through lever 51 to disengage the latch 52. Lever 51 is partially engaged in slot 52a. By moving the latch 52 away from the front panel 53, the lip 54 is disengaged from the yoke 47. This allows the yoke to be moved upwardly to a position to disengagement. Return spring 55 biases the motor 41 in the upward direction. The bias of return spring 55 is not as great as that of springs 48 so the yoke is normally biased toward its position of engagement.

In order to insert cartridge 56 into the drive, the bezel 57, which is rigidly mounted to the yoke 47, is moved to the open, or up position, thereby exposing the opening in the front panel 53. Cartridge 56 may then be inserted into the opening. The cartridge guide surfaces 59 are positioned adjacent the opening 58 in the front panel 53 of the disk drive. These locate the cartridge 56 in the proper orientation with respect to Bernoulli plate 59. Bernoulli plate 59 is rigidly attached to the underside of the drive base casting.

When cartridge 56 is fully inserted into the drive, the bezel 57 must be moved into the closed position. Springs 60, which are incorporated in the bezel 57, seat the cartridge 56 in the proper location in the disk drive so that the motor 41 successfully engages the hub 62 on the disk.

Cartridge present sensor 63 is engaged by making contact with the cartridge 56, thereby allowing the drive to begin its operation. When the drive reaches its operating speed the head 64, which is mounted on the end of actuator arm 65, is moved into position to retrieve, or record, the desired data with the actuator 66 mounted on the base casting.

The embodiment shown in FIGS. 7-10 is an improvement over that shown in FIGS. 1-6 in having an improved motor suspension system with reduced force with which the motor is held against the sliding surface. This eliminates the possibility of debris generating wear in the motor hub area. It also effects a simplification and cost reduction in the disk drive. Further improvement is effected by incorporation of the cartridge guide mechanism 59 in the front panel 53, rather than as a separate part.

While a particular embodiment has been shown and described, various modifications are within the true spirit and scope of the invention. The appended claims are, therefore intended to cover all such modifications.

What is claimed is:

1. A magnetic disk drive for writing and reading data to and from a magnetic disk contained in a cartridge which is inserted through an opening into said disk drive comprising:

a yoke rotatable about a pivot in said disk drive;

a bezel member mounted on the end of said yoke to normally close said opening;

a motor having a spindle for engaging said magnetic disk to rotate it, said motor being mounted on said yoke so that rotation about said pivot moves said bezel member out of said opening and moves said motor out of engagement with said disk and opposite rotation of said yoke moves said bezel member into said opening and moves said motor spindle into engagement with said disk; and a Bernoulli plate between said disk and said motor, the spindle of said motor engaging said disk through a hole in said plate, said spindle being pulled through said hole by rotation of said yoke to disengage said motor from said disk.

2. A magnetic disk drive for writing and reading data to and from a magnetic disk contained in a cartridge which is inserted through an opening into said disk comprising:

a yoke rotatable about a pivot in said disk drive;

a motor having a spindle for engaging said magnetic disk to rotate it, said motor being mounted on said yoke so that rotation about said pivot moves said motor out of engagement with said disk and opposite rotation of said yoke moves said motor into engagement with said disk;

a movable connection between said motor and said yoke; and reference surfaces on said base for guiding said motor, by movement of said movable connection, into proximity with said magnetic disk in a linear movement.

3. The magnetic disk drive recited in claim 2 wherein said motor has a flange and wherein said movable connection includes suspension springs between said flange and said yoke.

4. The magnetic disk drive recited in claim 1 or claim 2 wherein said disk and said spindle include hubs which are magnetically attracted to magnetically couple said motor and said disk.

5. The magnetic disk drive recited in claim 1 or 2 further comprising:

a base for said disk drive;

an actuator positioned on said base; and a magnetic read/write head carried by said actuator into read/write relationship with said disk.

6. The magnetic disk drive recited in claim 4 wherein said spindle has a shaft extension at the end thereof and wherein the hub on said disk includes a precision bore, said shaft extension engaging said bore to precisely position said disk with respect to said read/write head.

7. The magnetic disk recited in claim 1 or claim 2 further comprising:

reference pads on said base, said motor engaging said reference pads to accurately position the height of the spindle on said motor with respect to the height of said recording head above said base.

8. The magnetic disk recited in claim 1 or claim 2 wherein said flexible disk is enclosed in a rigid cartridge having an opening in one side thereof for engagement of said magnetic head and said motor with said disk from the same side of said disk.

9. The disk drive recited in claim 2 further comprising:

a bezel member mounted on the end of said yoke to normally close said opening;

a latch holding said bezel member in a position normally closing said opening; and an electrically actuated solenoid for opening said latch.

10. The magnetic disk drive recited in claim 9 further comprising:

a lever member between the actuator of said solenoid and said latch.

11. The magnetic disk drive recited in claim 2 wherein said disk drive has a base on which said yoke is pivoted and wherein said means for guiding includes a shaft on said base and a guide opening on said motor for linear movement along said shaft.

12. The magnetic disk drive recited in claim 11 wherein said guide opening includes a bushing mounted on said motor, said bushing traveling along said shaft.

13. The disk drive recited in claim 2 further comprising:

a front panel for said disk drive, said opening being in said front panel, said front panel having guide surfaces adjacent said opening, said cartridge being guided by said guide surfaces as it is inserted into said disk drive.

14. The disk drive recited in claim 2, and springs normally biasing said yoke in a direction which moves said motor spindle into engagement with said disk; and a return spring biasing said motor spindle out of engagement with said disk.

* * * * *